(12) United States Patent
Carter (10) Patent No.: US 7,915,535 B2
(45) Date of Patent: Mar. 29, 2011

(54) GROMMET INSTALLATION TOOLS AND METHODS

(75) Inventor: James A. Carter, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 275 days.

(21) Appl. No.: 12/235,871

(22) Filed: Sep. 23, 2008

(65) Prior Publication Data

US 2010/0071934 A1    Mar. 25, 2010

(51) Int. Cl.
*H01B 17/58* (2006.01)
(52) U.S. Cl. ............... 174/152 G; 174/153 G; 174/151; 174/658; 174/152 R; 16/2.1; 439/607; 277/606
(58) Field of Classification Search ........... 174/152 G, 174/153 G, 152 R, 151, 654, 658, 668; 248/56; 16/2.1, 2.2; 439/604, 607; 277/606, 628
See application file for complete search history.

(56) References Cited

U.S. PATENT DOCUMENTS

| 2,277,637 | A | * | 3/1942 | Eby ............................ 174/153 G |
| 5,545,854 | A | | 8/1996 | Ishida |
| 5,553,368 | A | | 9/1996 | Barry |
| 7,105,750 | B1 | | 9/2006 | Duhr |

OTHER PUBLICATIONS

Heyco product data sheet, available (last checked Dec. 23, 2008) at: http://www.heyco.com/products/sec_04/pdf/4-17.pdf.

* cited by examiner

*Primary Examiner* — Dhiru R Patel
(74) *Attorney, Agent, or Firm* — Boyle Fredrickson LLP; Alexander R. Kuszewski; John M. Miller (57) ABSTRACT

A grommet and corresponding installation system includes a grommet body with an outer surface and a cord that is attached to and extends outwardly from the grommet body, along with a grommet installation tool having a cord-engaging end removably attached to the cord such that the tool can be manipulated to tighten the cord which radially compresses the grommet body, whereby the tool can be used to pull the grommet through a panel hole when the grommet body is in such radially compressed state.

20 Claims, 5 Drawing Sheets

PRIOR ART

FIG. 9

GROMMET INSTALLATION TOOLS AND METHODS

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to wiring accessories, and more particularly to grommets and corresponding grommet installation tools and methods.

Electronic devices typically have panels, wall structures, compartments, or housings made of, e.g., metallic, plastic, sheet-like material(s). Often, conductors have to be routed through holes in such panels in order to electrically connect various components to each other or to auxiliary components. The perimeter edges of such panel holes tend to be rather sharp and may cut, abrade, or otherwise damage conductors extending therethrough. Accordingly, grommets are often installed concentrically in panel holes for preventing the conductors from contacting the sharp perimeter edges of the panel holes.

Grommets are often made from resilient, e.g., elastomeric, materials. The flexibility and deformability of such materials may accommodate or absorb some transverse pulling-type forces applied to conductors extending through a grommet and also may facilitate installation of grommets. In other words, the physical characteristics of some grommets allow them to be squeezed or folded down as they are inserted into the panel hole. When suitably positioned in the panel hole, the grommet is released and it unfolds or otherwise restores to its original configuration, locking it into or against the perimeter edge of the panel hole.

However, some grommets are relatively less flexible and require more effort to install. At times, installing such relatively less flexible grommets requires following detailed procedures or installation protocol set forth by a grommet manufacturer. Such relatively less flexible grommets are often implemented as sealed or liquid-tight configurations.

Liquid-tight characteristics of such liquid-tight grommets are achieved by providing (i) sealed interfaces between the grommets and panel holes, and (ii) sealed interfaces between the grommets and the conductors extending therethrough, and (iii) a continuous sidewall structure between the panel hole and conductor. In other words, when liquid-tight grommets are installed, due to a relatively large thickness dimension of the grommet circumferential sidewall, there is no discernable void space(s) between the conductors and grommets, or grommets and panel. In addition to the relatively thick circumferential sidewall, to achieve and maintain the liquid-tight functionality, such grommets are typically sized and configured so that they are held in a somewhat compressed state within the panel hole. This helps the liquid-tight grommet to squeeze downwardly on the conductors, ensuring a liquid tight seal between the grommet and conductor(s), and the grommet and panel.

Figure 9:
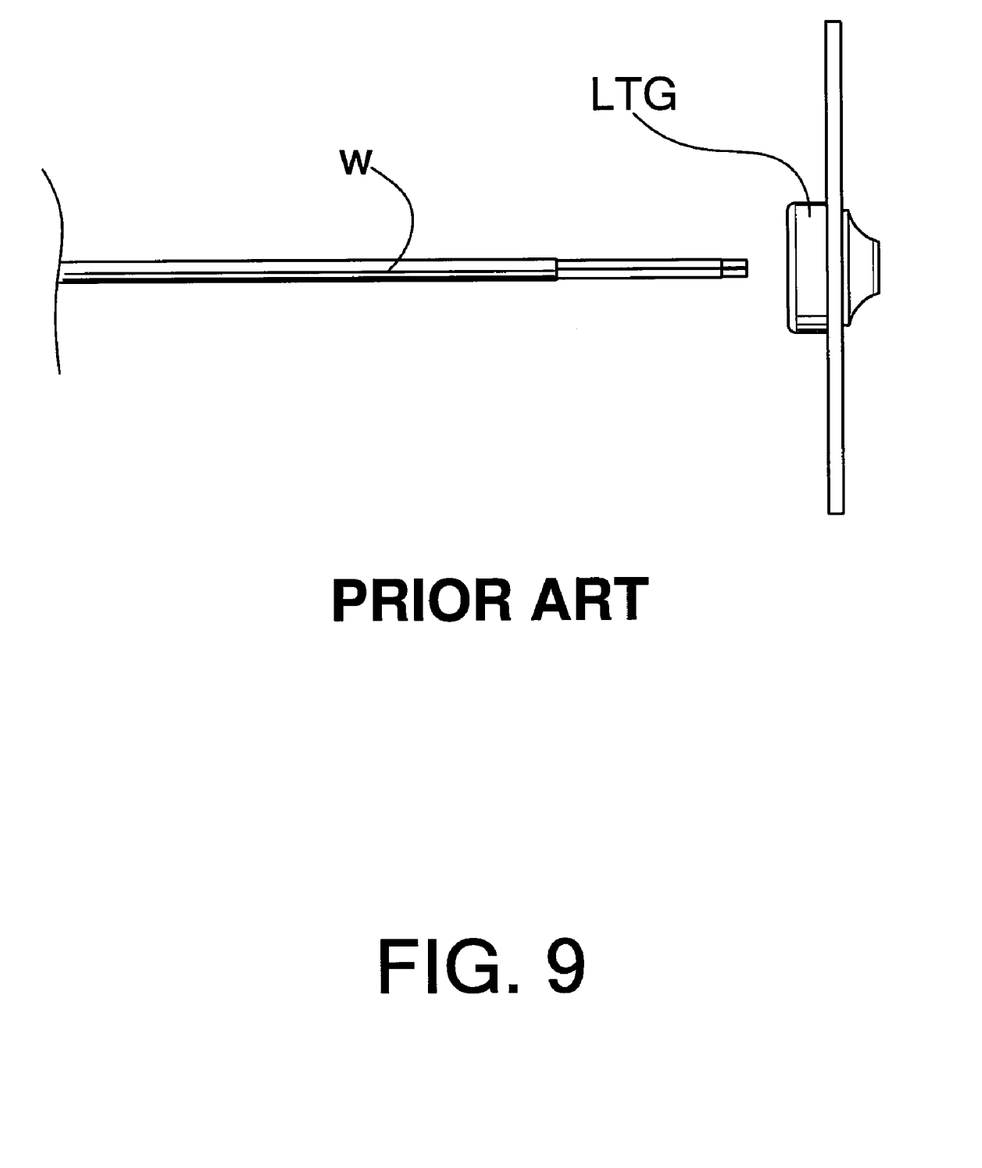
FIG. 9 is a side elevation view of a prior art liquid-tight grommet installed in a panel prior to receiving a conductor therethrough.

Due to the thick sidewalls and somewhat inflexible characteristics of liquid-tight grommets, such grommets cannot be folded down but rather are forcefully inserted axially into panel holes. Accordingly, many liquid-tight grommets have a tapering or frusto-conical end that inserts through a panel hole first. In this configuration, as the grommet axially advances through the hole, an outer surface of the tapering end engages the perimeter edge of the hole. As it is pushed further through the hole, the tapering end is concentrically squeezed by the hole, momentarily reducing the outer diameter of the tapering end to the same dimension as the inner diameter of the hole. Such diameter reduction, which facilitates the grommet installation, is primarily a function of collapsing the axial throughbore of the grommet while the grommet is pushed or pulled through the hole. Since liquid-tight grommets tightly or snugly hold conductors in the axial throughbores, the grommet must be installed in the panel prior to the conductor. This is because a preinstalled conductor fills the throughbore in its entirety and therefore does not permit the throughbore to collapse as required for the grommet's installation into the panel. Since conductors cannot be preinstalled in liquid-tight grommets, a device incorporating liquid-tight grommets must be wired onsite where the panel is located. In other words, liquid tight grommets are typically installed in a panel before a wire or conductor is pulled through the grommet. This conventional method can be seen in FIG. 9, illustrating a liquid tight grommet "LTG" installed in a panel, before a conductor or wire "W" is routed through the liquid tight grommet "LTG."

Notwithstanding, in light of the rapid globalization of manufacturing, it is often desirable to perform preassembly tasks, preinstall various components, and construct subassemblies, e.g., build wire harnesses, at locations that are geographically separated from a final assembly facility. More frequently now than ever, such separate facilities may be located in different countries. Factors such as labor costs, transportation infrastructure, facility operating costs, and others, influence which particular facilities are best suited for performing particular manufacturing and assembly processes and tasks. Frequently, it is cost effective to perform low-technology, low-skill processes and tasks, such as assembly of wire harnesses and grommets, at locations that are separate from final assembly facilities.

Despite best efforts, however, liquid-tight grommets cannot be preinstalled on conductors or wire harnesses at a facility other than the facility that has the corresponding panel in which the grommet will be mounted. This, at times, leads to grommet and wire harness assembly at economically inappropriate facilities, as well as increased final assembly times.

SUMMARY OF THE INVENTION

The present invention provides a grommet and corresponding installation system. The grommet installation system simplifies installation of relatively rigid grommets. It also allows for conductor or wire harness preinstallation into the grommet, whereby the grommet and wire harness can be installed in a panel in essentially a single step or procedure.

In some embodiments, the invention may provide an assembly aid, e.g., a cord or other device, that is preassembled to or integrated at least partially into a grommet. Such preassembly or integration of a cord or other assembly aid type device may be performed at a relatively low cost assembly facility. This may allow a value added contribution to an end use product by providing a conductor or wire harness assembly that eliminates a need for a final assembler, which may be located at a relatively high cost assembly facility to, e.g., install the cord or other assembly aid type device upon the grommet prior to performing the conductor or wire harness assembly installation procedure. Doing so may reduce the number of procedural steps to be performed at a relatively high cost assembly facility and correspondingly may also reduce the total production cost of the end use product.

Specifically then, in one embodiment, the grommet installation system includes a grommet having a grommet body with an outer surface and a cord that is attached to and extends outwardly from the grommet body. The system may further include a grommet installation tool having a cord-engaging end removably attached to the cord. The installation tool may be manipulated to tighten the cord, which radially compresses the grommet body, and then pull the grommet through a panel hole when the grommet body is in the radially compressed state. This allows a conductor or wire harness to be inserted through the grommet before the grommet is installed into the panel.

In a further embodiment, the present invention provides a grommet for mounting to a panel and having a grommet body with a longitudinal axis. The grommet body also has first and second lips that are axially spaced from each other, defining a groove therebetween. A cord may be attached to the grommet body and is used to pull the grommet into the panel hose. In other words, when a sufficient pulling force is applied to the cord, one of the first and second lips is pulled or drawn through the panel hole. At that point, a perimeter edge(s) of the panel hole sits in the grommet body groove and the first and second lips lie against first and second surfaces of the panel, whereby the first and second lips sandwich the panel. This allows the grommet to be fully installed by pulling the cord without having to fold down the grommet.

Thus, it is an object of at least one embodiment of the invention to provide a grommet installation system having a cord that can be used like a wire pulling fish-tape to pull the grommet into its mounted position. By providing a cord that can be used to pull a grommet into an installed position in a panel, the grommet may be installed without having to pry it into place with rigid tools that could potentially damage the grommet.

In a further embodiment, the cord engages and applies a variable radial compressive force to the grommet body, temporarily reducing its outer diameter. The grommet body can be radially compressed by, e.g., twisting a single end, two ends, or other portion of the cord, depending on the particular cord configuration. The grommet body may be generally cylindrical and the cord can extend about a major portion, optionally, the entire, circumference of the grommet body. In some implementations, the cord extends along the bottom of the groove and thus between the lips. The cord can be molded or otherwise incorporated at least partially into the grommet body. Manipulating the cord may cause it to constrict around the grommet body and correspondingly radially compress the grommet body.

Thus, it is an object of at least one embodiment of the invention to provide a grommet installation system having a cord that can constrict around the grommet body and apply a variable radial compressive force thereto. By applying a radially directed force to the grommet body, the outer diameter of the grommet body can be temporarily reduced, facilitating axial passage of the grommet body through a panel hole and thus grommet installation.

In a yet further embodiment, the grommet installation system includes a grommet installation tool. The tool includes a tool body, a cord-engaging end, and a handle, and it may be used to tighten the cord and radially compress the grommet body. In some implementations the tool body and handle are integral, extending longitudinally away from the cord-engaging end. The handle can also be arranged transverse with respect to the tool body, giving the tool an overall T-shaped configuration. The tool can be manually rotated about its longitudinal axis to tighten the cord and radially compress the grommet body, or it can have a lever that is actuated to rotate the cord-engaging end of the tool and thus also the cord.

It is thus another object of at least one embodiment to provide a tool that facilitates tightening the cord, constricting it around, and radially compressing the grommet body, by twisting the cord or otherwise. By facilitating cord tightening around a grommet, the grommet may be radially compressed, even if a conductor or wire harness is extending through the grommet, which eases grommet installation by, e.g., reducing the number of required installation steps.

These particular objects and advantages may apply to only some embodiments falling within the claims and thus do not define the scope of the invention.

DETAILED DESCRIPTION OF THE PREFERRED EMBODIMENT

Figure 1:
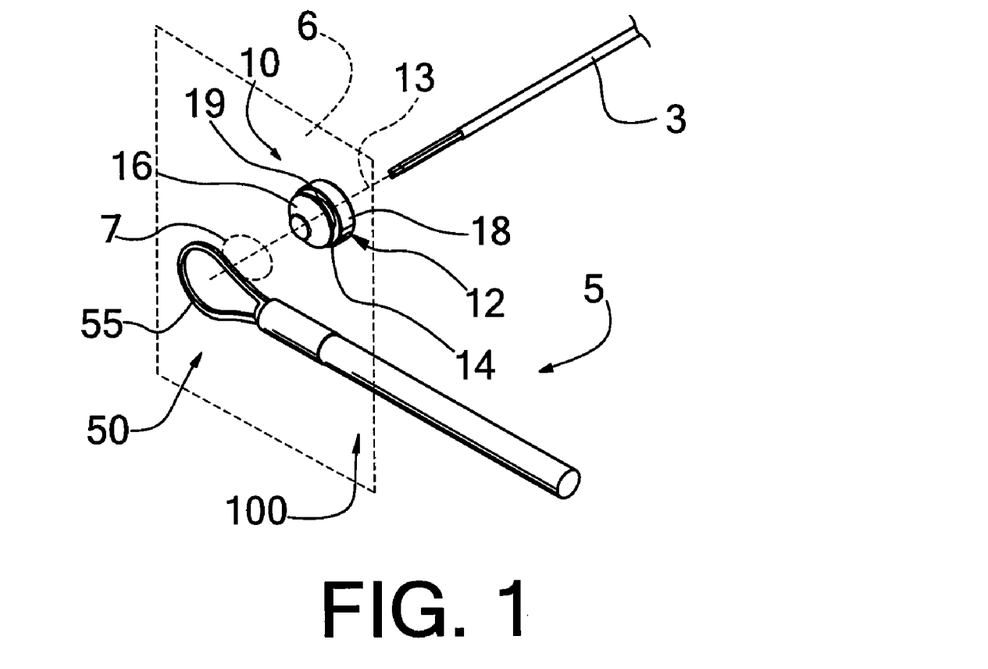
FIG. 1 is a pictorial view of a grommet installation system of the invention, shown with a first grommet installation tool and a liquid-tight grommet.

Referring now to FIG. 1, the present invention provides a grommet installation system 5 that includes a grommet 10 and cord 50 that may cooperate with a grommet installation tool 100 to ease installation of the grommet 10 into a panel 6. This correspondingly facilitates pulling, drawing, or routing electrical wires, e.g., conductors 3 through the panel 6, and optionally allows the conductors 3 to be preinstalled into the grommets 10, even for liquid tight versions of grommets 10.

Grommet 10 can have any of a variety of configuration, e.g., liquid tight that creates a seal between itself and panel 6 and between itself and conductor 3, or non-liquid tight that generally does not create a seal between itself and one or both of conductor 3 and panel 6. Regardless of the particular sealing characteristics and functionality of grommet 10, it may include a grommet body 12 having a longitudinal axis 13 and defining an outer surface 14.

Two lips, e.g., a first lip 16 and a second lip 18 may extend radially outward from the body 12 and may at least partially define the outer surface 14 of grommet body 12. The first and second lips 16, 18 are preferably axially spaced from each other, along the length of axis 13. A groove 19 is defined between the first and second lips 16, 18 and extends radially into the outer surface 14, preferably, also extending circumferentially about the grommet body 12. This configuration allows the groove 19 to receive a perimeter edge of a hole 7 that extends through panel 6, whereby the first and second lips 16, 18 lie on opposing sides or against opposing surfaces of the panel. In other words, when the grommet 10 is installed into panel 6, it is generally concentrically housed within panel hole 7 such that the first and second lips 16, 18 sandwich a corresponding portion of the panel 6 therebetween. Grommet 10 may be seated within hole 7 and thus installed into panel 6 by way of cord 50, alone and/or with grommet installation tool 100 or other suitable tool.

Figure 2:
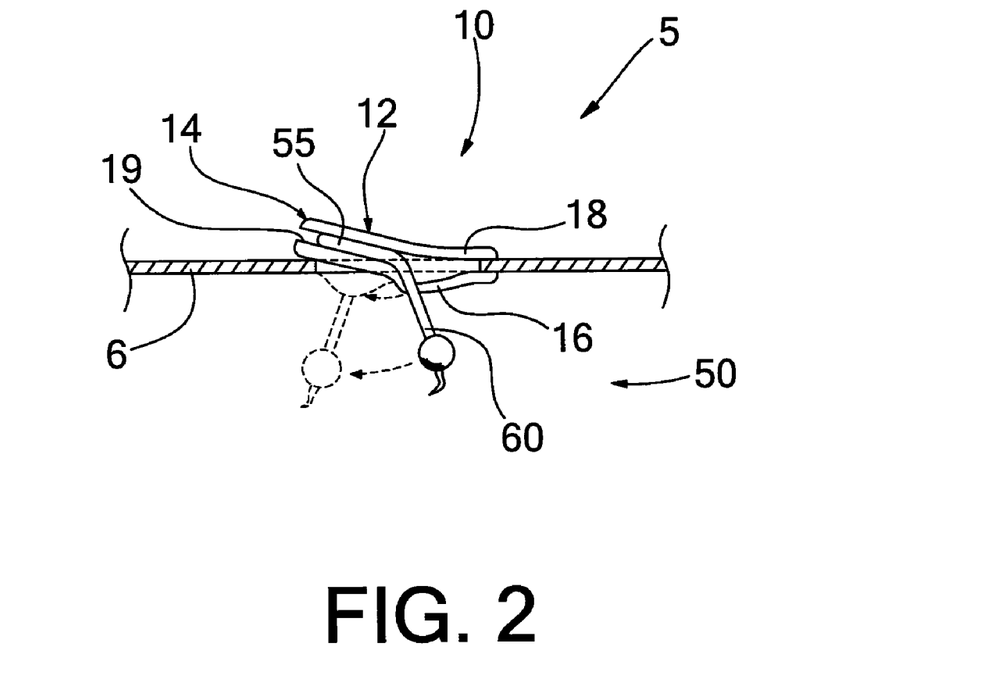
FIG. 2 is a side elevation view of a variant of the grommet installation system of FIG. 1, shown with a non-liquid-tight grommet.
Figure 3:
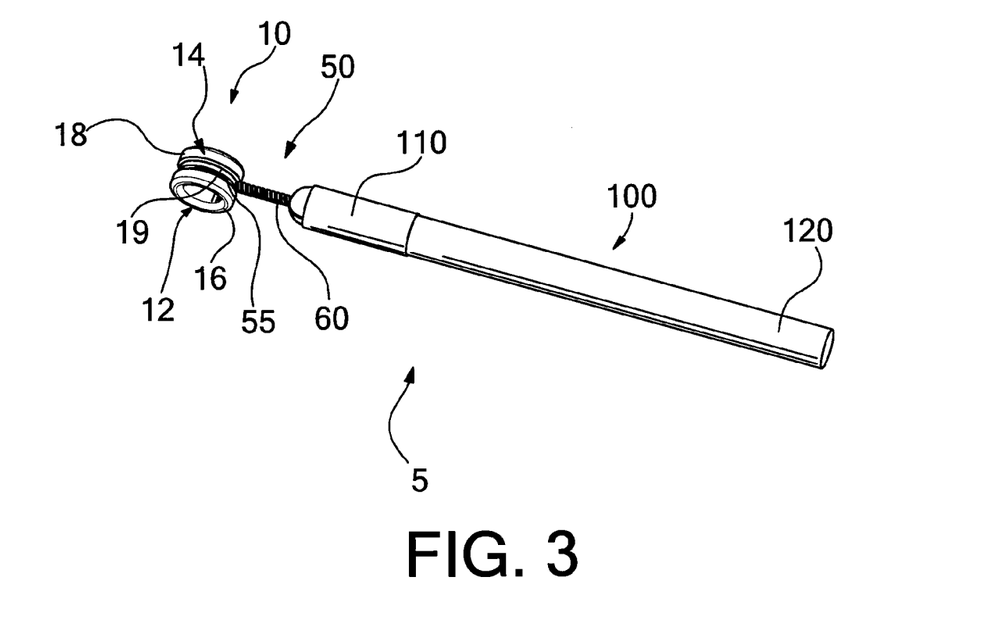
FIG. 3 is a pictorial view of a grommet installation system of the invention, shown with a non-liquid-tight grommet.

Referring now to FIGS. 1-3, cord 50 is configured to extend from the grommet body 12, e.g., the outer surface 14, and provides a pulling or gripping interface. In this regard, the pulling or gripping interface functionality of cord 50 allows a user to draw or pull the grommet 10 through hole 7 in panel 6 (FIG. 1) without having to directly contact the grommet 10 with a tool during the procedure, reducing the likelihood of tool-induced damage to the grommet 10, and also eliminating a need to try folding down grommet 10 or squeezing it through hole 7 by way of the user's own hands.

Still referring to FIGS. 1-3, cord 50 may be separate and distinct from the grommet 10 (FIGS. 1 and 2) or may be incorporated at least partially into the grommet 10. In some implementations, cord 50 may be molded or otherwise incorporated into grommet body 12 so that it extends from some portion of the outer surface 14, such as, e.g., one or more of first and second lips 16, 18, groove 19, or the opposing circular or annular ends of the body 12. As seen in FIG. 2, when cord 50 is incorporated at least partially into the grommet 10, it may be provided in the groove 19, nested against at least one of the first and second lips. Preferably, the adhesive or friction force between the cord 50 and the grommet 10 material that it is molded in, may be overcome by pulling once the grommet 10 is fully seated and installed. In other words, cord 50 may be molded into grommet 10 such that one, optionally two, ends extends or dangles from the body outer surface 14, and the cord 50 can be pulled free from its molded attachment to grommet 10 once the grommet 10 is installed.

For the separate cord 50 implementations, the user decides where to attach or connect the cord 50 to body 12, so that it extends from some portion of the outer surface 14, such as, e.g., one or more of first and second lips 16, 18, groove 19, or the opposing circular or annular ends of the body 12, explained in greater detail elsewhere herein. The particular location of cord 50 on body 12 depends on the desired alignment and pulling technique that is used for installing the grommet 10, as well as the characteristics of the cord 50 itself.

Referring still to FIGS. 1-3, cord 50 may be made of any of a variety of suitable materials having various characteristics, but is preferably an elongate, flexible member. For the embodiments that include an integral or molded cord 50, it is preferably made by incorporating the cord 50 profile into the mold, such that the cord 50 and the grommet 10 are made simultaneously during a single molding or other forming process, using the same elastomeric or flexible polymeric materials. As for the separate cord 50 implementations, the cords 50 may also be made from elastomeric or flexible polymeric materials. However, the separate cords 50 may be made from materials that are dissimilar to those of the grommet 10, so long as the cords 50 exhibit the desired flexibility, strength, durability, and resiliency to allow the cord 50 to be at times forcefully pulled while transferring such pulling forces to the grommet 10 during its installation, and do so for a duration of a suitable use life whether that is a single use or multiple uses. For example, a metallic wire, or a metallic wire substrate that is coated with a polymeric or elastomeric coating, or a paper coating similar to a twist-tie, or other elongate flexible members, may be suitable for use as cord 50.

Referring yet further to FIGS. 1-3, the cord 50 may be configured to transfer not only pulling forces to the grommet 10, but can also be configured to apply or transfer radially compressing or concentric squeezing-type forces to the grommet 10. Radially directed compressing forces can be applied to grommet 10, by way of cord 50, in any of a variety of suitable ways. For example, an end of cord 50 may include an opening through which the other end of cord 50 is threaded, imparting a noose-like or slipknot-type configuration to the cord, defining an open loop portion and a tail portion thereof. The open loop portion of cord 50 may be draped over or around the grommet 10, about its circumference, so that if the tail portion is pulled, the loop portion tightens around and concentrically squeezes the outer surface 14. In other words, for noose-like or slipknot-type configurations of cord 50, pulling a tail or loose portion of the cord 50, e.g., generally radially away from outer surface 14, applies a tightening or radially compressing force to grommet 10. Intuitively, as the tail portion is pulled, it becomes longer and the diameter of the loop portion becomes smaller, since material that was in the loop is pulled through the noose-like or slipknot-type opening and traverses to the tail portion, squeezing the grommet. 10 with a radially compressing force. In such implementation, the magnitude of the radially compressing force may be varied by pulling the tail or loose portion of cord 50 with relatively more or less force, as desired.

Referring yet further to FIGS. 1-3, in some implementations, the ends of cord 50 are devoid of openings. Instead, cord 50 may be configured as, e.g., a continuous loop with no discernable end(s) or may have a string-like elongate form with first and second opposing ends. In either regard, cord 50 may apply a radially compressing force to grommet 10 by twisting the cord 50 after it is draped or wrapped around the grommet 10. For continuous loop-type cords 50, the entire cord 50 may be draped concentrically around the grommet 10 and the slack removed to define a loop portion 55 that interfaces with the outer surface 14 and a tail portion 60 extending therefrom. For string-like versions of cord 50, it can likewise be draped or wrapped around the grommet 10. Then the two opposing ends may be brought together and the slack removed, defining a loop portion 55 and tail portion 60, much like the continuous loop versions of cord 50.

Regardless, the tail portion 60 may be twisted which draws more material from the loop portion 55, decreasing the diameter of the loop portion and correspondingly squeezing the grommet 10. In this manner, a circumferentially constricting or radially compressing force is applied to the grommet 10. Similar to the noose-like or slipknot-type embodiments, continuous loop or string-like embodiments may apply a variable radially compressing force to the grommet 10 by twisting the tail portion 60 relatively more or less, as desired. The pulling and/or twisting of tail portion 60 can be accomplished in any of a variety of ways, including the user's hands, pliers or other tools, or tools that are particularly adapted and configured for such tasks, e.g., grommet installation tool 100. In some embodiments, the cord 50 is made of materials and/or adapted to permit the cord 50 to generally retail a particular shape or configuration in a resting state, such as before and after being twisted or before and after pulling a grommet 10 without using a twisting technique. In other words, cord 50 may be configured to resiliently hold, e.g., an arcuate loop-type perimeter shape at its loop portion 55 while in a resting state.

Figure 4:
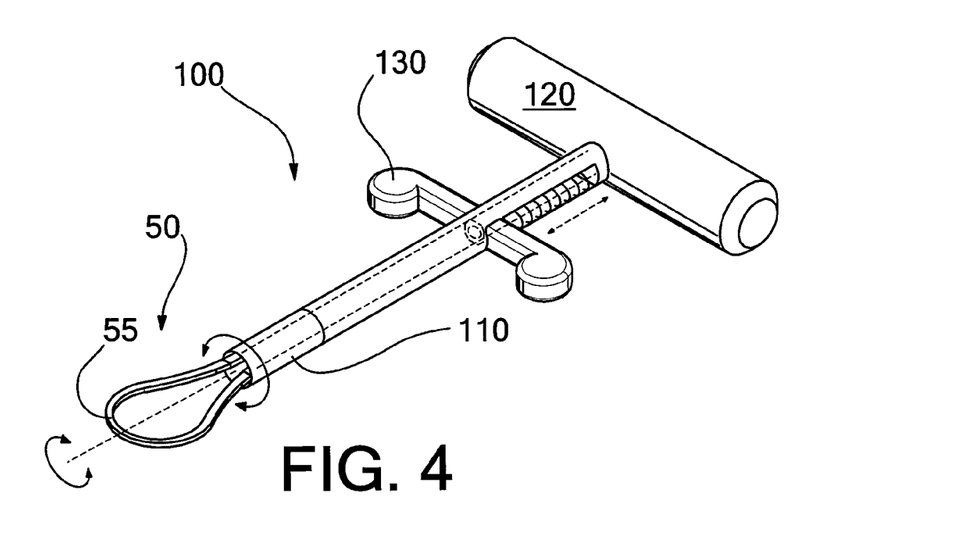
FIG. 4 is a pictorial view of a variant of the grommet installation tool of FIG. 1.

Referring now to FIGS. 1 and 4, grommet installation tool 100 includes a tool body 105 having a cord-engaging end 110 and a handle 120 at an opposing end, whereby part of the tool body 105 may extend longitudinally between the cord-engaging end 110 and the handle 120. Cord-engaging end 110 is configured to selectively hold or grip the cord 50, allowing the user to manipulate the cord 50. A split opening that compresses with a sleeve, a collet-type device, or other suitable clamping or grasping mechanism, is provided at the cord-engaging end 110 for releasably holding the cord 50. Handle 120 may be coaxially aligned, extend longitudinally from, and be integral with tool body 105 (FIG. 1). Or, handle 120 may extend in some other direction, e.g., transversely with respect to the remainder of the tool body 105 to define an overall T-shaped configuration of the grommet installation tool 100 (FIG. 4).

Referring still to FIGS. 1 and 4, regardless of the particular handle 120 configuration, grommet installation tool 100 facilitates application of the radially compressing force of cord 50 to grommet 10. For example, grommet installation tool 100 may be manipulated in a manner that twists a tail portion 60 of cord 50 and thereby concentrically constricts or radially compresses the grommet 10. To achieve this twisting effect of cord 50, the grommet installation tool 100 may be rotated about its longitudinal axis (FIG. 1). For some grommet installation tools 100, such as the one illustrated in FIG. 4, a lever 130 may be operably coupled to a rotatable cord-engaging end 110, whereby actuating the lever 130 correspondingly rotates the cord-engaging end 110. This may be accomplished by incorporating corresponding threaded components that are configured to convert linear motion into rotational motion. In other words, lever 130 in combination with a component that rotates or drives cord-engaging end 110, may define, e.g., a ball and screw or lead screw-type configuration that allows the user to actuate the lever 130 by squeezing and correspondingly rotate the cord-engaging end 110.

Referring now to FIGS. 5-8, in light of the above, grommet installation system 5 facilitates installation of a grommet 10 into a substrate such as panel 6. Grommet installation system 5 also permits preinstallation of conductors 3 into grommet 10 before the grommet 10 is installed into the panel 6, if desired. Accordingly, a user may first create a grommet/conductor subassembly by sliding the conductors 3 through grommet 10. Cord 50 is wrapped around the outer circumferential surface of grommet 10. In some instances, such as when grommet 10 is a liquid-tight grommet that can require a relatively large amount of force for installation, it may prove desirable to wrap a loop portion 55 into groove 19 of the grommet body 12. A tail portion 60 of cord 50, extending away from the grommet body 12, may be received into and held by a cord engaging end 110 of a grommet installation tool 100.

Figure 5:
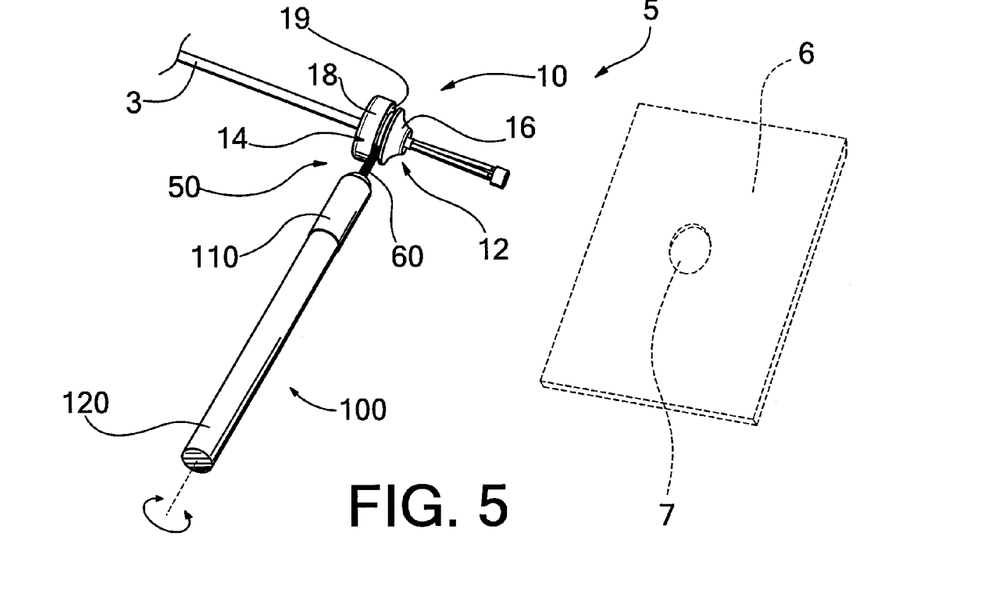
FIG. 5 is a pictorial view of a grommet installation tool attached to a grommet before the grommet is installed in a panel.
Figure 6:
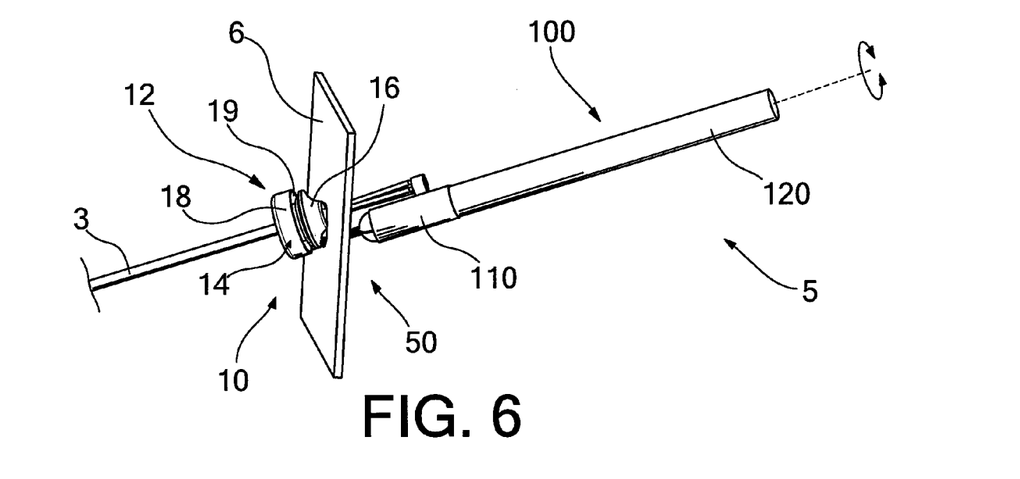
FIG. 6 is a pictorial view of the grommet installation tool and grommet of FIG. 5, initiating pulling a grommet before the grommet is installed in a panel.

Referring now to FIGS. 5 and 6, by manipulating tool 100, e.g., by actuating a lever (FIG. 4) or rotating the tool 100 about its longitudinal axis 13, the tail portion 60 of cord 50 is twisted, which reduces the diameter of the loop portion 55. Correspondingly, cord 50 tightens down around the groove 19, reducing a diameter of the outer surface 14 at the groove 19, but also at adjacent segments such as first lip 16. Stated another way, manipulating grommet installation tool 100 may reduce the outer perimeter size or diameter of the leading portion of grommet 10, the portion that is first inserted into the panel 6. Grommet 10 may be radially compressed before portions of the conductor 3 and/or grommet installation tool 100 are inserted through a panel hole 7, such as seen in FIG. 5. Using such technique, after the grommet 10 is radially compressed and the handle 120 is then inserted through the panel hole 7 before initiating the pulling, whereby at that point, the grommet installation tool 100 and grommet 10 lie on opposing sides of the panel 6 (FIG. 6). Optionally, the tail portion 60 of cord 50 is and a leading end of conductor 3 are first fed through the panel hole 7, whereby grommet installation tool 100 is rotated while it and grommet 10 are on opposing sides of the panel (FIG. 6).

Figure 7:
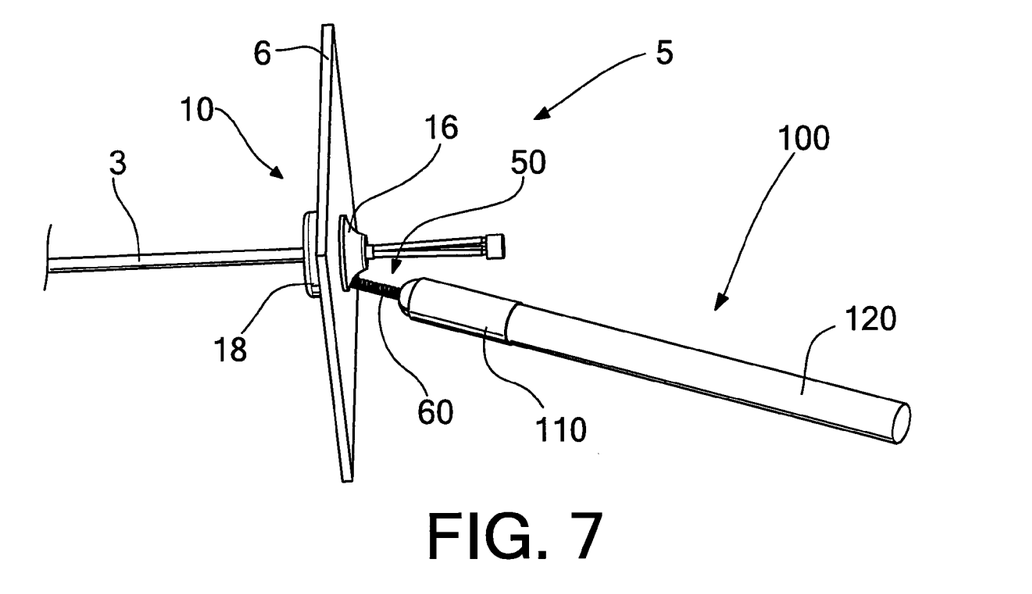
FIG. 7 is a pictorial view of the grommet installation tool and grommet of FIGS. 5 and 6, with the grommet being initially seated in the panel.

Referring now to FIGS. 6 and 7, with grommet 10 in a radially compressed state, a pulling force is applied to grommet installation tool 100 in a direction that extends generally axially away from the panel hole 7. Such pulling force is transferred through cord 50, to grommet 10. If the cord 50 was wrapped into groove 19, then the surface of first lip 16 that faces into the groove 19 serves as a mechanical stop or shoulder that prevents or mitigates the likelihood of non-desired removal of cord 50 from grommet 10. In other words, by putting cord 50 into groove 19, first lip 16 may prevent the cord 50 from sliding or rolling out of the groove 19 while the grommet 10 is being pulled into panel hole 7.

In addition to or in lieu of the radial compression technique, some embodiments of cord 50 may have a strand as a tail portion 60, with the remainder of cord 50 optionally molded into the grommet body 12. In these implementations, the lip 16 is not pulled through in its entirety during one distinct pulling event, but rather partially emerges from the panel hole 7 over time, until eventually the whole lip 16 passes through the panel hole 7. State another way, if the force required to unitarily pull the entire lip 16 through the panel hole 7 is too great, then it can be pulled through piecewise or a bit at a time. For example, cord 50 can be wrapped into and around groove 50 so that as it is pulled axially through the panel hole 7, it unwinds therefrom while simultaneously forcing the portion of the lip 16 that the cord lies over, at a given point of time, through the panel hole 7. In this regard, cord 50 may pull the lip 16 through the panel hole 7 as a circumferentially advancing segment that emerges from the panel hole 7 with an increasing length over time, in a wave-like motion traveling about the perimeter of the hole, until the entire lip 16 is pulled through. This allows installation of grommets 10 that have relatively irregular perimeter shapes, e.g., grommets 10 that are radially asymmetrical.

Figure 8:
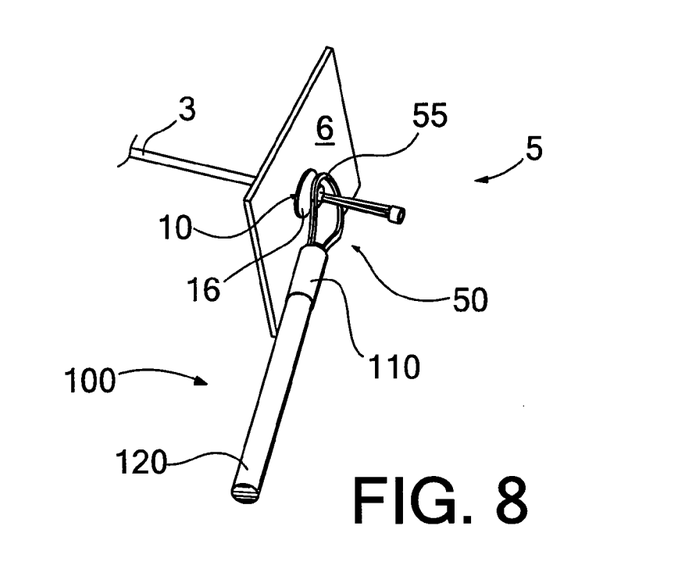
FIG. 8 is a pictorial view of the grommet installation tool and grommet of FIGS. 5-7, with the grommet fully seated in the panel.

Referring now to FIGS. 7 and 8, once the grommet 10 seats within panel hole 7 (FIG. 7), the tension and twist can be relieved from the tail portion 60 of cord 50. This can be done by rotating the grommet installation tool 100 about its longitudinal axis 13 in the opposite direction, unwinding the twisted cord 50. Then, then cord 50 may be left in the grommet installation tool 100 and pulled out and over the grommet (FIG. 8), or the tail portion 60 of cord 50 may be released from the cord engaging end 110 of tool 100. If the cord 50 is released from the tool 100 before it is removed from, e.g., between the perimeter edge of panel hole 7 and grommet 10, then the cord 50 is withdrawn therefrom by the user's hands, a pliers, or other tool(s). Or, if the cord 50 is at least partially integrated into the grommet 10, then the cord 50 can be pulled free of its molded, adhesive, or other attachment to the grommet 10.

It is apparent that grommet installation system 5 may facilitate installation of grommets 10 into panels 6, and may further allow installation of grommets 10 having conductors 3 preinstalled therein. The grommet installation system 5 facilitates radial compression of a grommet 10 without direction contacting the grommet 10 with any rigid tool, and without requiring manual folding or bending of the grommet. This allows grommets 10 to be installed in panel holes 7 without, e.g., tugging at grommet lips 16, 18 with pliers, prying the grommets 10 with screwdrivers or other tools, or implementing other techniques which might damage the grommet during the installation process.

It is specifically intended that the present invention not be limited to the embodiments and illustrations contained herein and the claims should be understood to include modified forms of those embodiments including portions of the embodiments and combinations of elements of different embodiments as come within the scope of the following claims.

What we claim is:

1. A method of installing a grommet into a panel having a hole cut therein, the method comprising:
   (a) wrapping a cord attached to a handle in a loop within and around a groove of the grommet, the groove flanked on opposing sides by a first radially extending elastomeric lip and a second radially extending elastomeric lip;
   (b) pulling the cord through the hole while the grommet is placed against the hole and aligned with the hole so that the cord pulls the first elastomeric lip through the hole to concentrically seat the grommet in the hole with the first and second elastomeric lips on opposite sides of the panel.

2. The method of claim 1 wherein the cord is wrapped around the groove by placing the cord within the groove and twisting the handle.

3. The method of claim 2 wherein a conductor is inserted through an axial throughbore of the grommet prior to insertion of the grommet.

4. The method of claim 3 wherein the grommet is mounted to a wire harness before the grommet is installed into the panel.

5. The method of claim 1 wherein the cord is releasably adhered to the groove that extends circumferentially about the grommet.

6. A grommet installation tool for a grommet having a body with a circumferential groove flanked by radially extending elastomeric lips, the grommet installation tool comprising:
   (a) a handle
   (b) a cord sized to be received within the groove along substantially all of the circumference and to extend outwardly beyond the grommet body to have both ends of the cord attached to the handle;
   whereby the cord may be wrapped around the groove of the grommet and with the grommet (i) placed against a hole extending through a panel in which the grommet is being installed, and (ii) aligned with the hole, the cord may be pulled through the hole to circumferentially pull one of the lips through the hole to concentrically seat the grommet in the hole.

7. The grommet installation tool of claim 6 wherein the grommet installation tool includes a lever that is actuated for twisting the cord.

8. The grommet installation tool of claim 7 wherein the lever is generally parallel to the handle and pulling the lever toward the handle twists the cord.

9. The grommet installation tool of claim 8 wherein a tool includes a rotatable cord engaging end and a generally linear motion of the lever is converted to rotational movement of the cord engaging end.

10. The grommet installation tool of claim 8 wherein the cord defines a default resting configuration in which the cord resiliently holds an arcuate loop-type perimeter shape.

11. A grommet for mounting to a panel, comprising:
   (a) a grommet body having a longitudinal axis and including
      (i) a first lip for engaging a first surface of the panel and extending transversely with respect to the grommet body longitudinal axis;
      (ii) a second lip for engaging a second surface of the panel and being parallel to and axially spaced from the first lip; and
      (iii) a groove defined between the first and second lips and extending radially into the grommet body; and
   (b) a cord attached to and extending from at least one of the first lip, the second lip, and the groove of the grommet body,
   wherein a pulling force applied to the cord draws one of the first and second lips through a hole provided in the panel.

12. The grommet of claim 11 wherein the cord engages and applies a variable radial compressive force to the grommet body.

13. The grommet of claim 12 wherein the cord extends about a major portion of the circumference of the grommet body.

14. The grommet of claim 13 wherein the cord extends about the entire circumference of the grommet body.

15. The grommet of claim 12 wherein at least a portion of the cord is molded into the grommet body.

16. The grommet of claim 15 wherein the cord can be removed from the grommet body by pulling it therefrom.

17. The grommet of claim 12 wherein the cord extends circumferentially along a reduced diameter portion of the grommet body defined at a bottom portion of the groove.

18. The grommet of claim 12 wherein twisting an end of the cord radially compresses the grommet body.

19. The grommet of claim 12 wherein pulling the cord draws the first or second lip through as a circumferentially advancing segment that emerges from the hole with an increasing length over time, in a wave-like motion traveling about the perimeter of the hole.

20. The grommet of claim 19 wherein the grommet has an irregular shape that is radially asymmetrical.

\* \* \* \* \*